Patented Jan. 4, 1938

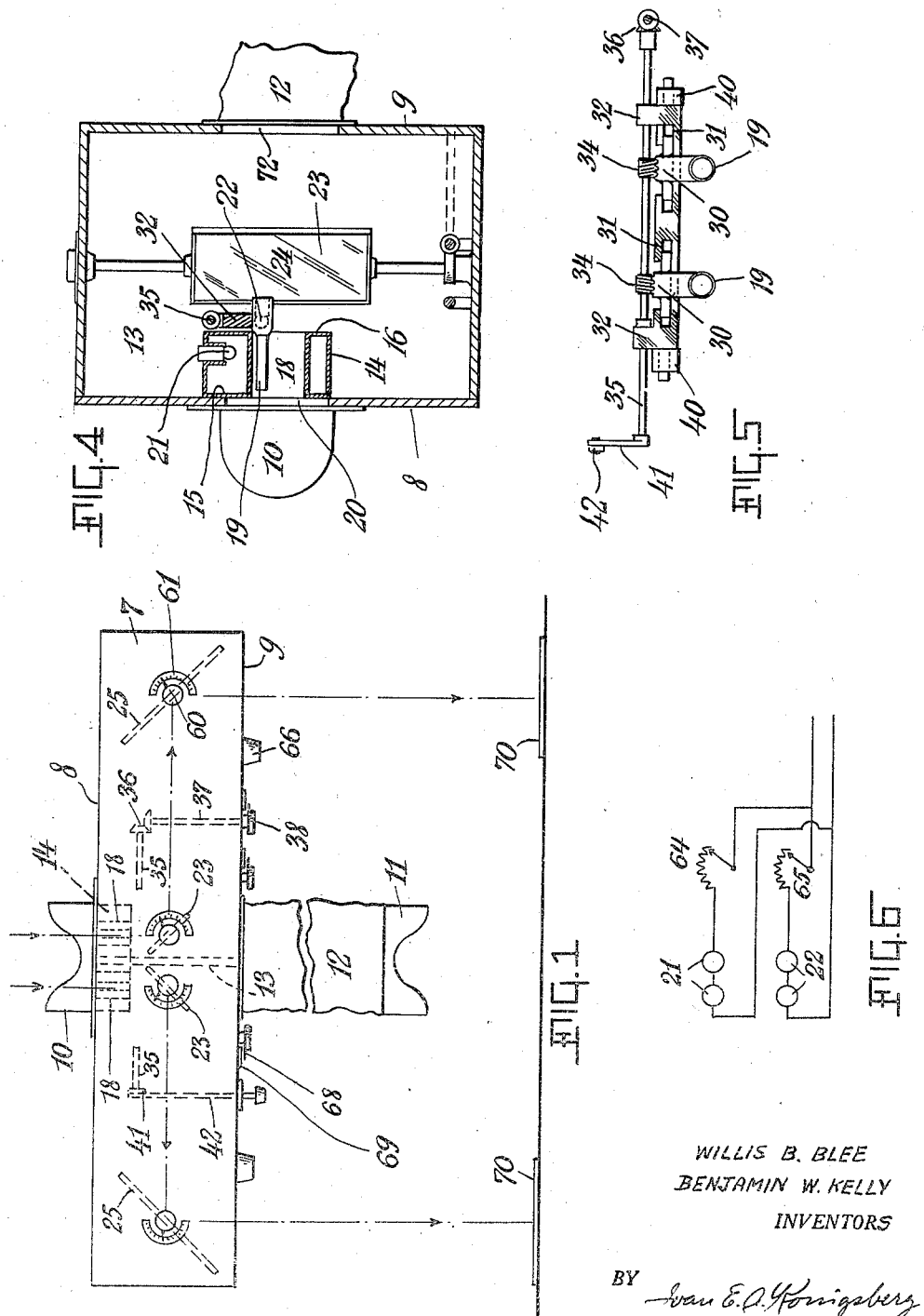

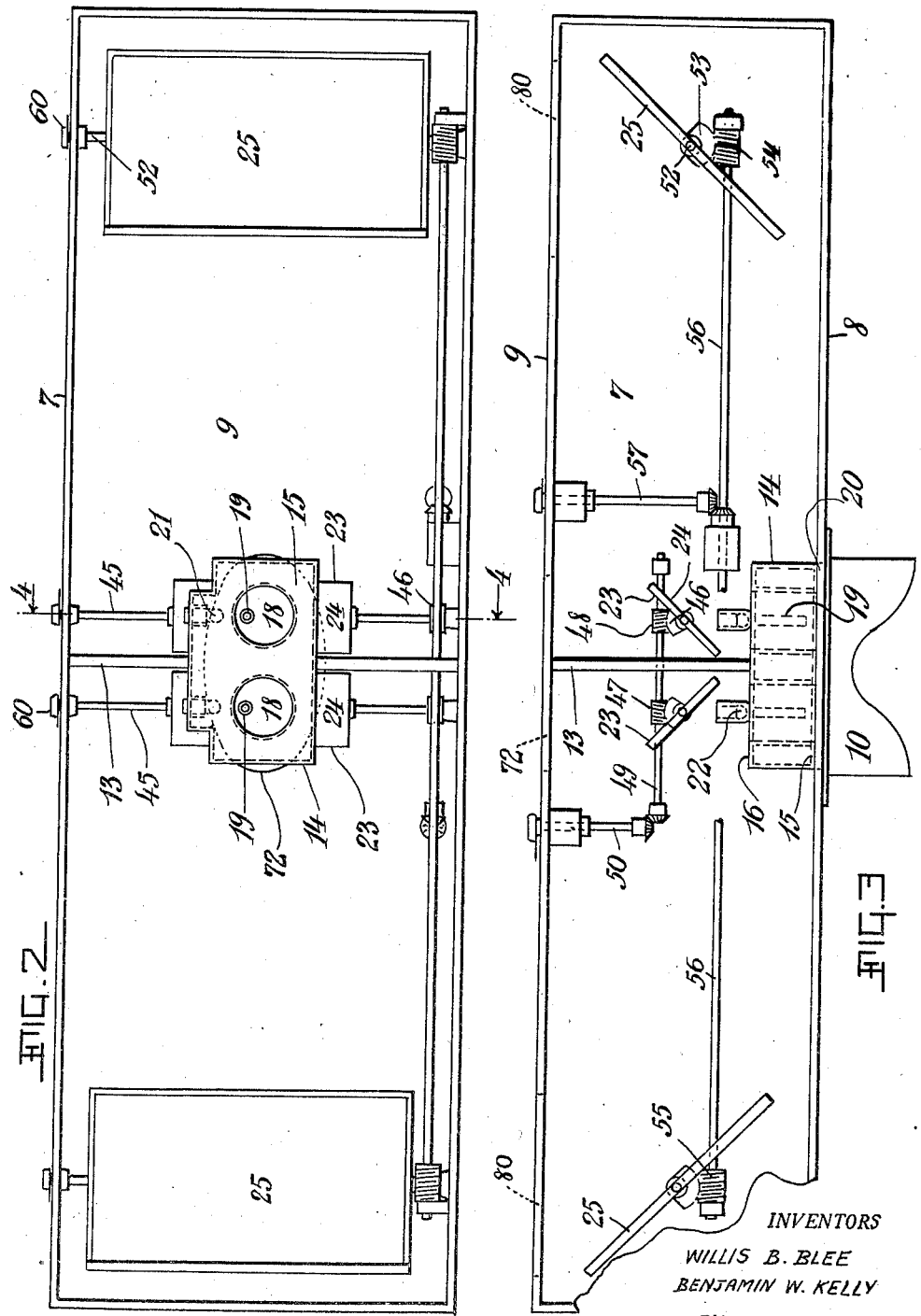

2,104,552

UNITED STATES PATENT OFFICE 2,104,552

OPTOMETRIC APPARATUS

Willis B. Blee, Rockville Centre, and Benjamin W. Kelly, New York, N. Y.

Application May 5, 1936, Serial No. 77,908

8 Claims. (Cl. 88—20)

This invention relates to improvements in optometric apparatus and has particular reference to an apparatus providing for direct observation of the muscular movements of the eyes of a person having defective eye sight or other eye trouble. Certain defects of the human eye may be cured or corrected by diagnosis prescribing certain muscular exercises. These are carried out with the assistance of an apparatus whereby the patient's eyes are exercised or trained with the further assistance of suitable charts or targets which may be stereoscopic pictures for instance. It is of course of immense importance that the optometrist or eye doctor be able to observe directly whether the patient is following the prescribed eye exercises, not only by observing the patient's eyes while such exercises are carried out but for the further purpose of observing the effect of any certain prescribed practice so that corrections or further diagnosis may be made. It is also of importance that the optometrist or eye doctor be provided with means for adjusting the apparatus to suit any particular case.

The object of this invention is to provide an optometric apparatus arranged and designed to enable a person with defective eye sight or other eye trouble to practice such exercises as may be prescribed by an optometrist or eye doctor who at the same time and unseen by such person is able to directly observe the eyes of the patient. Another object of the invention is to provide such an optometric apparatus with certain controlling and adjusting sub-mechanisms as will permit or afford the necessary opportunity for adjusting the apparatus to the patient's case.

Accordingly the invention is embodied in an optometric apparatus arranged and designed as hereinafter set forth and as illustrated in the accompanying drawings in which Fig. 1 is a top plan view of the apparatus.

Fig. 2 is a front view of the apparatus with the front cover removed.

Fig. 3 is a top view with the top removed.

Fig. 4 is a sectional view on line 4—4 of Figure 2.

Fig. 5 illustrates a certain adjusting mechanism.

Fig. 6 is a wiring diagram.

The apparatus is in the form of an oblong rectangularly shaped box 7 having a front wall 8 and a rear wall 9. The front wall carries a hood 10 for the patient to look into and rest his head against, said hood being shaped in the usual manner to completely shut off outside light from the patient's eyes. The rear wall carries a similar hood 11 for the use of the optometrist. The hood 11 is connected to the box by a sleeve 12 so that the optometrist may move his head about while observing the patient. The box is provided with a centrally disposed supporting partition 13. Located immediately behind the front wall and suitably secured to the partition 13 there is located an eye observation unit 14 which is in the form of a box having a front plate 15 of translucent material and a rear wall 16 which may be of any non-transparent material. The unit forms two eye openings 18, 18 the walls of which are of non-transparent material. The eye openings extend clear through the unit. Within each eye opening there is supported a corneal reflection tube 19. The front plate 8 of the box has an opening 20 so that the patient may look directly through the hood 10 into and through the eye openings. The hood 10 may be a part of the eye observation unit and extend through the opening 20, or the hood may otherwise be mounted in fixed or detachable relation.

The interior of the eye observation unit is illuminated by one or more small electric lamps 21. Each corneal tube is lighted by an electric lamp 22. A transparent mirror 23 is adjustably mounted in optical alinement with each eye opening 18. The reflecting surface 24 of the mirror faces the eye opening. 25, 25 denote other reflecting mirrors adjustably mounted at each end of the box in optical reflecting alinement with the transparent mirrors 23. Means are provided for adjusting the pupillary distance between the corneal reflection tubes and their angular position within the eye openings. Means are also provided for adjusting the positions of the mirrors 23 and 25. These adjusting mechanisms may be of any convenient type and only examples are indicated in the drawings.

Figure 5 illustrates diagrammatically a mechanism for adjusting the corneal tubes. In this instance each tube is carried by a support 30 adapted to slide in guides 31 in a tiltable base 32. Each support 30 has a rack engaged by right and left hand screws 34 respectively as shown. The screws are carried by a shaft 35 which is rotated by gears 36, operable from a shaft 37 which extends outside the box and carries a knob 38 for handy manipulation by the doctor. The supporting base 32 is pivoted in bearings 40, 40 secured to the back of the tube unit and which may be tilted by means of levers 41 and 42 in an obvious manner. The lever 42 extends outside the box for convenient manipulation by the doctor.

The transparent mirrors 23 are mounted on shafts 45 which have segmental racks 46 engaged by a right and a left hand screw 47, 48 respectively for adjustment by turning a shaft 49. The latter is geared to an operating shaft 50 which extends outside the box. Similarly the reflecting mirrors 25 are mounted on shafts 52 which have segmental racks 53 engageable by a right and a left hand screw 54, 55 carried by a shaft 56 operable from a shaft 57 which extends outside the box. Outside the box on the top thereof the shafts 45 and 52 may carry pointers 60 moving over scale plates 61, Fig. 1, to show at a glance the positions of the mirrors. 80 indicates openings for the mirrors 25.

Figure 6 is a wiring diagram showing separate controls for the two sets of lamps 21 and 22. Separate rheostat controls 64 and 65 are provided to adjust the degree of illumination. Of course the wiring system will be complete with a transformer or other devices known to the electric art for properly connecting and regulating the current from the usual supply. Such devices are not shown as they form no part of this invention. It should be noted however, that the rheostats are adjustable from the outside of the box by means of knobs 66, Fig. 1. All the shafts and levers which extend outside the box and which are to be operated by the optometrist will preferably be provided with pointers 68 moving over suitable indicating scales 69 as indicated in Figure 1.

In operation the patient sits in front of the box 7 and puts the face against the hood 10 looking directly into the transparent mirrors through the eye openings. In the mirrors the patient will see the reflected pictures or charts 70 as will be understood. The doctor sits behind the box and looks into the hood 11 through an opening 72 in the rear wall and directly through the transparent mirrors into the eye openings where he sees the eyes of the patient. The current having been turned on, the light from the lamps 21 will shine through the translucent plate 15 and the eye of the patient will therefore be illuminated. The light from the lamps 22 in the corneal tubes will shine directly through said tubes into the eyes of the patient to show the corneal reflection. The optometrist or eye doctor is thus able to observe directly the movements of the patient's eyes and the patient is not embarrassed or disturbed by looking into the face of the optometrist. Both sets of lamps 21 and 22 may be used at one time or each set separately as the case may call for. By rotating the shaft 37 the pupillary distance between the corneal tubes may be adjusted and they may be tilted by pushing or pulling on the lever 42. Also by operating respectively the shafts 50 or 57, the positions of the mirrors 23 and 25 may be adjusted. It will be noted that all the operating knobs or handles are located at the back of the box 7 so as to be within easy reach of the optometrist or doctor.

The inside of the box will be painted black and the partition 13 not only serves as a part of the construction but functions as a dividing member between the fields to be observed by the eyes of the patient in a manner well known in optometry.

The most important feature of this invention resides in the fact that the optometrist or eye doctor is able to observe the patient's eyes directly while adjusting the apparatus to suit the case. The mechanical arrangements illustrated are merely by way of examples. They may be changed in actual manufacturing practice. These and other changes and alterations may be made by persons skilled in such arts and without departing from the principle of the invention or the scope of the appended claims.

We claim:—

1. An apparatus of the character described comprising a closed box, an observation unit therein having eye openings through which a person may look from the front of the box, a corneal reflection tube in each of said openings, a hood in front of the box for enclosing the eyes of a person looking through the eye openings, means for adjusting the interpupillary distance between the corneal tubes to accord with the interpupillary distance of the eyes of the said person, an electric lamp in each of said tubes and an opening in the back of the box for affording natural direct observation of the said person's eyes and the corneal reflexes therein while the person is looking through the said openings.

2. An apparatus of the character described comprising a box, an observation unit therein having eye openings, a corneal reflection tube in each of said openings, a hood in front of the box for enclosing the eyes of a person looking through the eye openings, means for adjusting the interpupillary distance between the corneal tubes to accord with the interpupillary distance of the eyes of the said person, an electric lamp in each of said tubes, an opening in the back of the box for direct observation of the said person's eyes and the corneal reflexes therein while the person is looking through the said openings and means for illuminating the eyes of the said person during the observation.

3. An apparatus of the character described comprising a box, an observation unit therein having a pair of eye openings, a hood in front of the box for enclosing the eyes of a person looking into the box through the openings, a transparent reflecting mirror in alinement with each opening, a reflecting mirror in optical alinement with each of the transparent mirrors for reflecting images of objects outside the box into the same and an opening in the back for observing the eyes of the said person from the back of the said box through the said back opening, the said reflecting mirrors and the eye openings.

4. An apparatus of the character described comprising a box, a hollow observation unit therein having a translucent front plate and a pair of eye openings extending clear through the said unit, an opening in the front of the box through which the said translucent plate and eye openings are visible, a hood for enclosing the eyes of a person looking into the box through the said openings, means for illuminating the interior of the observation unit whereby to cause light to shine through the translucent front plate thereof to illuminate the eyes of the said person, a plurality of reflecting mirrors for observing images of objects outside the box through the said eye openings, means for adjusting the positions of said mirrors and an opening in the back of the box for directly observing the eyes of the person while he is observing said outside objects.

5. An apparatus of the character described comprising a box having a front opening, a transverse partition therein bisecting said opening, an observation unit therein having two eye openings, one on each side of the said partition, a hood in front of the box enclosing the eyes of a person looking through the said openings, a transparent reflecting mirror in optical alinement with each opening, a reflecting mirror in optical alinement with each transparent mirror and an opening in the back of the box bisected by the said partition for directly observing the eyes of the said person while he is looking through the said eye openings.

6. An apparatus of the character described comprising a box, a transverse partition therein, an observation unit therein having an eye opening on each side of the partition, a corneal tube in each eye opening, a hood in front of the box including the said eye openings, a translucent plate in front of the said unit apertured by the said eye openings, electric lamps for illuminating the interior of the box and cause light to shine through said translucent plate into the said hood, other electric lamps for sending light beams through the corneal tubes, mirrors for reflecting outside objects into the eye openings, said mirrors including a pair of transparent mirrors in alinement with each opening, an opening in the back of the box for looking into the said eye openings through the transparent mirrors, said back openings being bisected by the said partition, means for controlling the said lamps, means for adjusting the positions of all of said mirrors and means for adjusting the corneal tubes in two different planes.

7. An optometric apparatus of the character described comprising a box having a front opening, an observation unit within the box behind said front opening and having two eye openings extending through said unit, a corneal reflection tube in each eye opening, a hood in front of the box surrounding the front opening for enclosing the eyes of a person looking through the said eye openings, an unobstructed opening in the back of the box in alinement with the said front opening, a rear hood enclosing the eyes of a second person looking through the said back opening and into the said eye openings for observing the eyes of the first person and means for adjusting the corneal tubes in two different planes and means interposed between the said front eye openings and the said unobstructed back opening for preventing the said first named person from observing the eyes of the said second named person.

8. An apparatus of the character described comprising a box having an opening in the front and rear walls thereof, a transverse partition bisecting said openings, an observation unit secured to the front wall of the box behind the said front opening and having an eye opening extending clear through said unit on each side of the partition, a corneal tube in each eye opening, a translucent plate forming the front of said observation unit, a hood in front of the latter, electric lamps in said unit for causing light to shine through the said translucent plate into the hood, other electric lamps for sending light beams through the corneal tubes, mirrors for reflecting the images of outside objects into the said eye openings, said mirrors including two transparent mirrors in alinement with each opening, means for regulating the said electric lamps, means for adjusting the positions of all of said mirrors and means for adjusting the corneal tubes in two different planes, the said rear opening and transparent mirrors serving as means for affording observation of the eyes of a person looking through the said front hood and eye openings.

WILLIS B. BLEE.
BENJAMIN W. KELLY.